United States Patent [19]

Johnson

[11] Patent Number: 4,491,406
[45] Date of Patent: Jan. 1, 1985

[54] METHOD AND APPARATUS EMPLOYING DUAL PHOTOCELLS FOR REMOVING SPECTRAL FILTER DURING STROBE PULSE

[75] Inventor: Bruce K. Johnson, Andover, Mass.

[73] Assignee: Polaroid Corporation, Cambridge, Mass.

[21] Appl. No.: 108,381

[22] Filed: Dec. 31, 1979

[51] Int. Cl.³ .................. G03B 7/087; G03B 7/099; G03B 15/05
[52] U.S. Cl. .................................... 354/416; 354/429; 354/436; 354/482
[58] Field of Search ............... 354/416, 417, 422, 429, 354/430, 434, 436, 482, 437, 476, 483

[56] References Cited

U.S. PATENT DOCUMENTS

| | | |
|---|---|---|
| 3,176,599 | 4/1965 | Anwyl . |
| 3,208,363 | 9/1965 | Easterly et al. . |
| 3,229,569 | 1/1966 | Frost et al. . |
| 3,245,309 | 4/1966 | Wick et al. . |
| 3,270,638 | 9/1966 | Anwyl et al. . |
| 3,310,679 | 3/1967 | Babish ............................ 354/31 X |
| 3,314,349 | 4/1967 | Koeber, Jr. . |
| 3,468,228 | 9/1969 | Rogers ........................... 354/234 X |
| 3,518,926 | 7/1970 | Bing . |
| 3,583,299 | 6/1971 | Land . |
| 3,672,281 | 6/1972 | Land . |
| 3,717,077 | 2/1973 | Harvey . |
| 3,832,722 | 8/1974 | Douglas ............................ 354/29 |
| 3,896,458 | 7/1975 | Johnson et al. ..................... 354/30 |
| 3,903,413 | 9/1975 | Manning ......................... 354/59 X |
| 3,942,183 | 3/1976 | Whiteside ........................... 354/29 |
| 4,032,935 | 6/1977 | Lermann ......................... 354/31 X |
| 4,040,070 | 8/1977 | Hochreiter et al. ................. 354/59 |
| 4,040,072 | 8/1977 | Johnson et al. ................... 354/173 |
| 4,075,640 | 2/1978 | Ueda et al. ........................ 354/31 |
| 4,104,653 | 8/1978 | Johnson et al. ..................... 354/27 |
| 4,147,418 | 4/1979 | Whiteside ........................... 354/27 |
| 4,150,888 | 4/1979 | Filipovich ........................... 354/25 |
| 4,155,029 | 5/1979 | Yamaoka ......................... 315/151 |
| 4,156,564 | 5/1979 | Tsunekawa et al. ................. 354/59 |
| 4,160,588 | 7/1979 | Beach ............................... 354/31 |
| 4,174,161 | 11/1979 | Mashimo et al. ................... 354/33 |
| 4,315,675 | 2/1982 | Johnson ......................... 354/27 X |
| 4,351,593 | 9/1982 | Johnson et al. ................. 354/33 X |
| 4,358,186 | 11/1982 | Johnson et al. ................. 354/30 X |

Primary Examiner—William B. Perkey
Attorney, Agent, or Firm—Leslie J. Payne

[57] ABSTRACT

Method and apparatus for automatically switching between alternate ones of a pair of light sensing photocells having different photoresponsive characteristics in an exposure control system usable with a photographic apparatus. Included in the system is a light integrating circuit responsive to a first one of the photocells until commencement of a flash mode and then to the other until termination of such flash mode at which time the circuit is again responsive to the first photocell.

42 Claims, 6 Drawing Figures

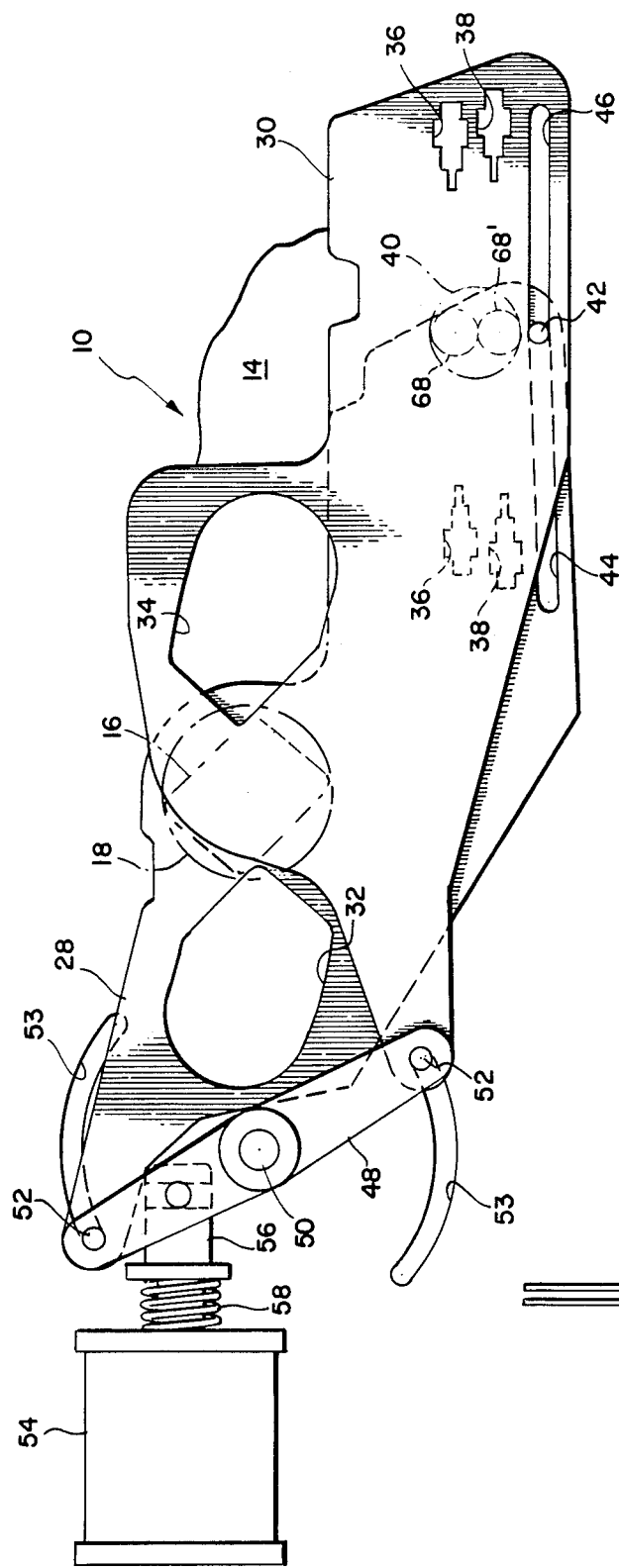
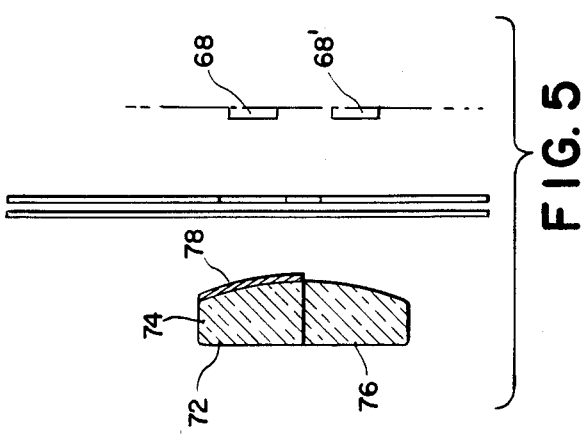

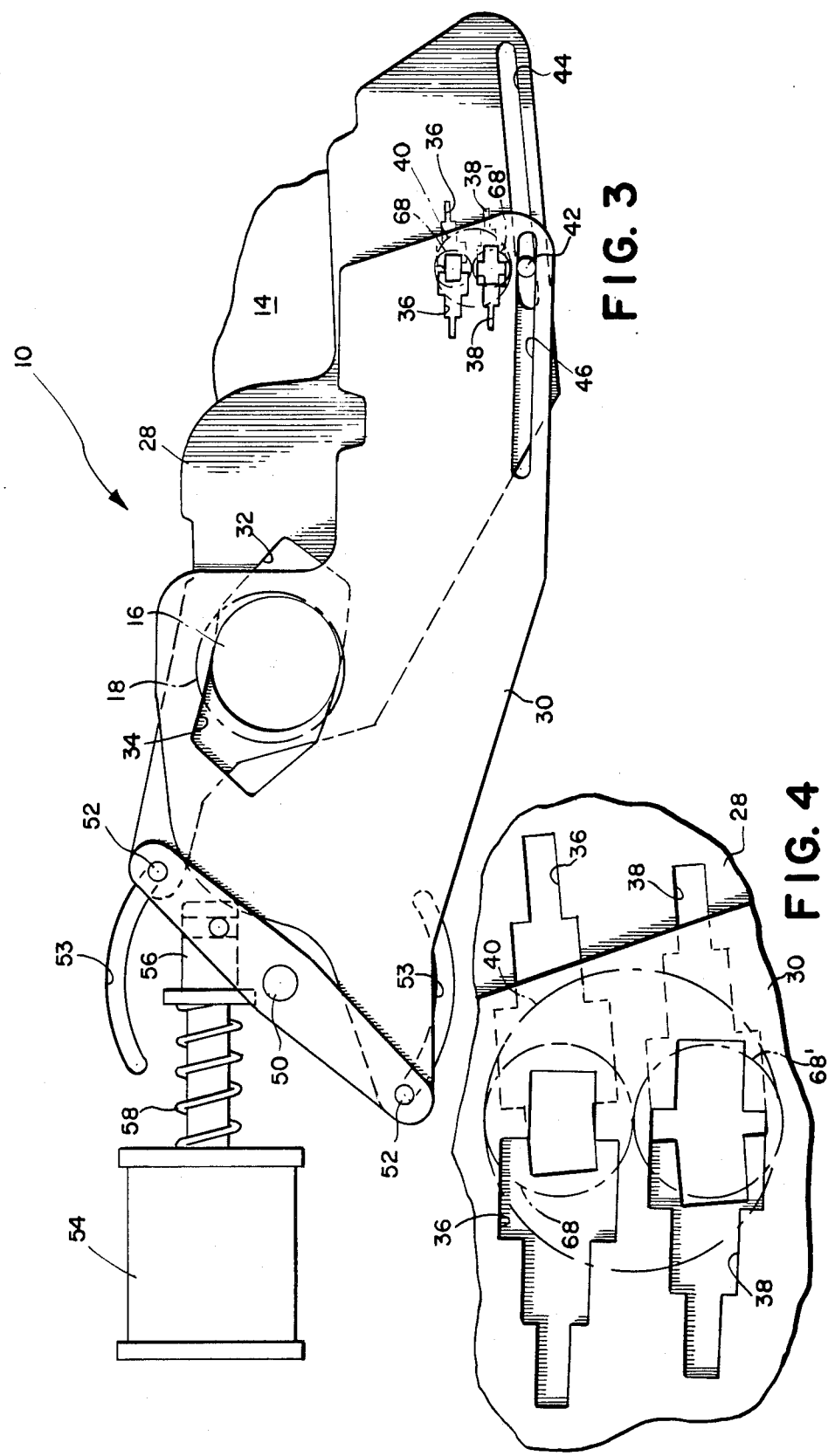

METHOD AND APPARATUS EMPLOYING DUAL PHOTOCELLS FOR REMOVING SPECTRAL FILTER DURING STROBE PULSE

BACKGROUND OF THE INVENTION

This invention relates generally to the photographic field and, more particularly, an improved method and exposure control system for automatically switching between alternate ones of at least two different photoresponsive regions having different photometric responses as a function of the beginning and ending of a flash mode.

Automatic light responsive control systems are well known in the photographic arts. Essentially, these systems evaluate scene brightness levels of illumination for controlling exposure parameters, including effective aperture size and exposure interval, as a function of scene brightness evaluated against the sensitometric characteristics of the film being used. Typically, scene brightness evaluation is performed with light-measuring circuits including one or more photoresponsive elements.

One such automatic exposure control system employs scanning type shutter blades. Exemplary scanning shutter blades usable in exposure control systems are generally disclosed in U.S. Pat. No. 3,942,183, issued Mar. 2, 1976, to George Whiteside; and U.S. Pat. No. 4,104,653, issued Aug. 1, 1978, to Bruce K. Johnson et al., all of which are presently assigned with the present application. As described in these patents, there are cooperating pairs of primary and secondary apertures formed in the shutter blades. These pairs of apertures cooperate respectively for blocking and unblocking the passage of light through an exposure opening to a film plane and through a photocell opening to a light sensing or photoresponsive cell used for controlling blade positioning. During the exposure cycle, the secondary apertures operate in conjunction with the photocell and a control circuit to define both the aperture values achieved and the exposure interval as a function of the amount of light received through the secondary apertures. In such systems, photoresponsive elements of the silicon type are commonly used because they, among other things, have excellant long term stability and linearity of output signal with input light power changes.

For optimizing the quality of the resultant photographs when using automatic exposure control systems, such as the type noted, it is known to employ spectral correction filters to correlate the spectral sensitivity curve of the photoresponsive element more closely with that of the photographic color film. Without such a filter, the photocell would react to the light frequencies, such as infrared (IR), and cause the control circuit to terminate exposure earlier than desired. This is especially the case when the photocell is of the silicon type, because sych a photocell tends to be red (IR) sensitive. For providing the desired correction, a spectral correction filter is interposed in the photocell's optical path, for example, as described in U.S. Pat. No. 3,903,413, issued on Sept. 2, 1975, to Monis Manning; and commonly assigned with the present application. This patent discloses use of a silicon photodiode, sensitive to radiant energy between about 350 nm and 1200 nm, whereas the sensitivity of typical color photographic film is confined to the visible region of the spectrum, i.e., from about 400 nm to about 700 nm. Use is made of a spectral correction filter with peak absorption in the near-infrared region (700-1200 nm) and high transmission in the visual region to correct or generally match the spectral response of the photocell in relation to the film. This matching of sensitivities is particularly useful in cameras employing diffusion transfer photographic processes of the so-called "instant photography" type where errors in the exposure cannot be later compensated for as is possible with film subsequently developed in a photographic laboratory.

While use of infrared filters serve satisfactorily, complications can arise when reflectivities of different objects in photographic scenes exhibit widely disparate values, for example, where the exposure of the subjects's facial skin is adversely affected because of the widely disparate reflectivities of the surrounding clothing or other objects, particularly in close-up situations. Partly as a result of this, it has been found advantageous to remove the infrared filter in flash exposure modes of operation.

Consequently, although retention of spectral correction filter in the photocell's optical path has been practiced during both ambient and artifical illumination modes, as disclosed in U.S. Pat. No. 4,040,070, issued on Aug. 2, 1977, to W. Hochreiter et al., a spectral correction filter is removed from the photocell's optical path when the flash mode is desired. This removal is achieved, upon attaching a flash unit to the camera, by actuation of a relatively complicated mechanical arrangement which swings the filter out of the optical path.

Still other known prior art is described in U.S. Pat. No. 3,468,228, issued on Sept. 23, 1969, to Howard G. Rogers, which provides automatic sequential positioning of a pair of dual filters over photocell and exposure apertures to attain a color balance exposure of photosensitive material.

Approaches have been developed which represent substantial improvememts over those known in the prior art. In this regard, copending applications entitled "Method and Apparatus For Varying the Infrared Filter Over the Photocell as a Function of Blade Position", of Milton Dietz; "Method and Apparatus For Selective Positioning of Spectral Filter During Exposure Control"; of Bruce K. Johnson et al.; and "Method and Apparatus For Selective Positioning of Spectral Filter During Exposure Control"; of Bruce K. Johnson, Ser. Nos. 110,811; 108,219; and 108,546 now abandoned in favor of continuation application Ser. No. 156,198; respectively, filed Jan. 10, 1980, Dec. 31, 1979, June 3, 1980 , and commonly assigned disclose exposure control systems for automatically controlling scene light intensity and spectral filtering thereof during an exposure interval as a function of blade mechanism positioning which itself is a function of the scene light intensity. More specifically, they effffectively remove a blocking infrared filter relative to the photocell detector during a portion of the exposure interval. These systems operate extremely satisfactorily. However, during use, certain situations arise in which passing of IR radiation to the photocell does not occur each time there is flash fire. Consequently, there is a certain degree of compromise in terms of the fact that the noted IR filter is not always removed during the flash.

SUMMARY OF THE INVENTION

In accordance with the present invention, there is provided an improved method and apparatus wherein an exposure control system usable with a photographic apparatus is responsive to selective ones of a pair of photoresponsive regions having different photoresponsive characteristics as a function of commencement and termination of flash firing.

As in prior exposure control systems, there are means for directing image forming rays from a scene along a given path to photographic film material. Included in such systems are means for unblocking and blocking passage of scene light along said path to provide an exposure interval, as well as means for sensing and summing light radiation from the scene during the exposure interval. Also provided in such system are means responsive to the sensing and summing means for controlling the unblocking and blocking means to define an exposure interval selected in accordance with an accumulated total of scene light sensed by the sensing and summing means. For producing a pluse of illumination which is directed at the scene during a short portion of the exposure interval, this invention provides flash means.

In an illustrated embodiment, the noted sensing means includes at least a pair of photoresponsive regions having photoresponsive characteristics different from the other with one of the regions tailored for sensing ambient scene illumination and the other tailored for sensing flash scene illumination. This embodiment includes means for automatically employing each one of the photoresponsive regions so that scene radiation is summed from the other region during a flash portion of the exposure interval and from the one region during another portion of the exposure interval.

In a preferred embodiment, the one region is responsive to infrared and visible spectral energy, whereas the other region is responsive to the visible spectral energy to the exclusion of the infrared spectral energy.

Among the objects of the invention are, therefore, the provision of an improved exposure control system for photographic apparatus wherein the sensing and summing means is responsive to different ones of photoresponsive regions having different photoresponsive characteristics as a function of the beginning and ending of a flash pulse during an exposure interval; the provision of an improved photographic apparatus having an exposure control system wherein the sensing and summing means is responsive to alternate ones of photoresponsive regions having different photoresponse characteristics in accordance with the beginning and ending of a flash during an exposure interval; and the provision of a method of automatically switching between alternate ones of photocells having different photoresponsive characteristics as a function of the commencement and termination of flash during an exposure interval.

Other objects and further scope of applicability of the present invention will become apparent from the detailed description to follow when taken in conjunction with the accompanying drawings in which like parts are designated by like reference numerals.

BRIEF DESCRIPTION OF THE DRAWINGS

FIG. 1 is a front elevational view diagrammatically depicting the improved exposure control system in a scene light blocking arrangement;

FIG. 3 is an elevational view diagrammatically depicting the exposure control system of FIG. 1 in a scene light admitting arrangement;

FIG. 4 is an enlarged fragmented view diagrammatically depicting the sweep photocell apertures in overlying relation to a light sensing and detecting station;

FIG. 5 is a diagrammatic view illustrating the arrangememt of the photocell lens, the shutter blades and the dual photocell detectors.

DETAILED DESCRIPTION

Figure 2:
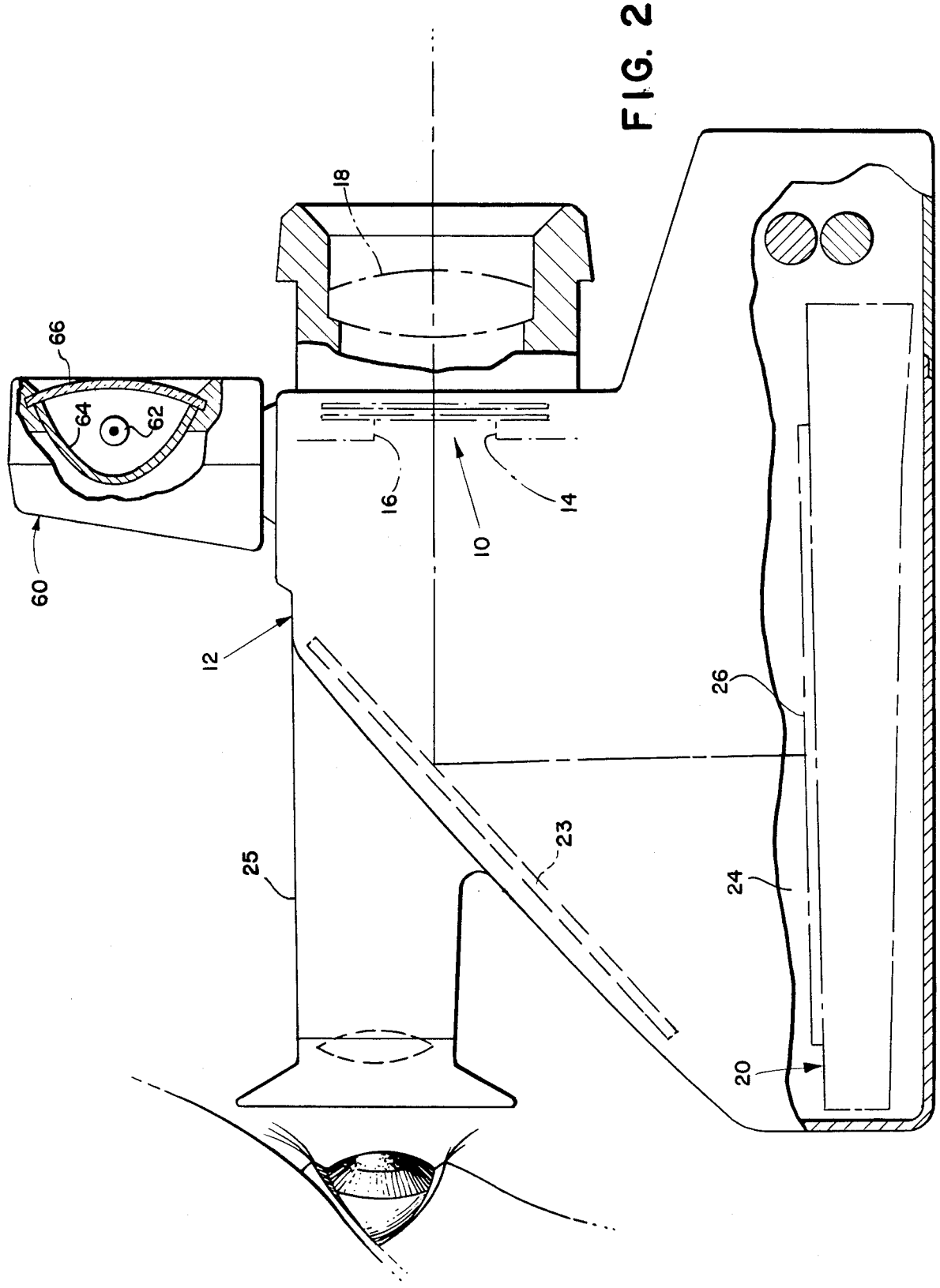
FIG. 2 is a side elevational view diagrammatically depicting a photographic camera embodying the exposure control system shown in FIG. 1.

Referring now to FIGS. 1 and 2, there is shown generally at 10 a photographic exposure control system disposed in camera housing 12 about a baseblock casting 14 selectively machined for supporting various components of a photographic exposure control mechanism. Centrally disposed within the baseblock casting 14 is a light entry exposure opening 16 defining the maximum available exposure aperture for the system. An objective or taking lens 18 is provided in overlying relation to the light entry opening 16 for focusing image carrying rays through the light exposure opening. In this embodiment, the taking lens 18 may be of the fixed focus type. Variable focus lens systems, in lieu of the fixed focus kind, may also be provided. Image carrying rays from the scene to be photographed are directed by the taking lens 18 rearwardly to a photographic film unit (not shown) of a film pack 20 by way of a reflecting mirror 22 stationed in a suitable light-tight film exposure chamber 24. Each of the film units of the film pack 20 is successively positioned at the focal plane 26 of the camera. Examples of such a film pack 20 are described in U.S. Pat. Nos. 3,543,662; 3,705,542; 3,748,484; 3,779,770; and 4,040,072.

Although the above exposure control system 10 has been described for use with photographic cameras of the non-reflex type, the intended scope of this invention is by no means so limited. Accordingly, cameras of the well-known reflex type, such as described in U.S. Pat. No. 3,672,281, entitled "Reflex Camera", by E. H. Land, commonly assigned herewith, may be equally suitable for embodying the exposure control system of this invention.

Additionally, a viewing window (not shown) is located in the front face of the camera housing 12 and operates in conjunction with a viewing system 25 for permitting viewing and framing of the scene to be photographed by the operator.

Intermediate the objective lens 18 and the light entry exposure opening 16 is provided a shutter blade mechanism comprising two overlapping shutter blade elements 28 and 30 of the so-called "scanning type" which will be subsequently described in greater detail herein. A pair of scene light admitting primary apertures 32 and 34 are provided respectively in the blade elements 28 and 30 to provide overlapping relationship to the light entry exposure opening 16 and thereby to cooperatively define a progressive variation of effective aperture values thereat in accordance with simultaneous longitudinal and lateral displacement of one blade element with respect to the other blade element. Such kind of displacement is fully described in U.S. Pat. No. 3,942,183, entitled "Camera With Pivoting Blades", by George Whiteside, issued Mar. 2, 1977, in common assignment herewith and now incorporated by reference herein.

Each of the blades 28 and 30 is additionally configured to have a pair of photocell sweep secondary apertures shown respectively at 36 and 38. The cooperating pairs of sweep secondary apertures 36, 38 are configured to track in a predetermined corresponding relationship with respect to the scene light admitting primary apertures 32 and 34. As apparent, the pairs of photocell sweep secondary apertures 36 and 38 move in the same manner as the primary apertures 32, 34 for defining corresponding small secondary effective aperture values for admitting scene light to, as later described in detail, a novel light sensing and summing station 40 of the present invention for the purpose of controlling the light incident thereon.

With continued reference to FIGS. 1 and 3, there is seen projecting from the baseblock casting 14, at a location spaced laterally apart from the light entry exposure opening 16, a pivot pin or stud 42 guided within the elongate slots 44 and 46 formed in respective shutter blade elements 28, 30 so as to allow pivotal and translational movement of the shutter blades. Retention of the stud 42 in engaging relation with respect to the shutter blades 28, 30 is accomplished by any suitable means, such as peening of the outside end of the stud.

Extended end portions of the shutter blade elements 28, 30 are pivotally connected to a walking beam 48. In turn, the walking beam 48 is disposed for rotation relative to the casting 14 by pivotal connection to a projecting pivot pin 50 formed on the baseblock casting at a location lateral of the light entry exposure opening 16. An E-ring or the like pivotally retains the walking beam 48 with respect to the pin 50. For pivotally connecting the walking beam 48 to the shutter blade elements 28, 30, there are provided pin members 52 extending outwardly from the walking beam 48 and through respective openings in respective shutter blade elements to the slots 53 in the baseblock 14. Thus, the foregoing provides the shutter blade elements 28, 30 with the means for mounting such blade mechanism for movement between the scene light blocking arrangement shown in FIG. 1 to a scene light admitting arrangement shown in FIG. 3 defining, preferably, a maximum primary exposure value.

Driving means for displacing the noted blade mechanism relative to the casting 14 includes a solenoid 54. Included in the solenoid 54 is a plunger unit 56 retractable into the solenoid body upon solenoid energization. The solenoid plunger unit 56 is affixed to the walking beam 48 so that longitudinal displacement of the plunger unit operates to rotate the walking beam 48 about the pivot pin 50. This rotation is effective for displacing the shutter blades 28, 30. Such driving means also includes a helical compression spring 58 surrounding the plunger unit 56 for continuously urging the blade elements 28, 30 into positions defining the largest effective primary aperture over the light entry exposure opening 16. In some shutter blade arrangements it is preferable to utilize a tension spring in place of the compression spring 58, such as in a manner shown in U.S. Pat. No. 3,942,183, supra. Thus, with the spring connection herein described, the exposure control system 10 is biased to continuously urge the shutter blade elements 28, 30 into an open scene light admitting or unblocking orientation; shown in FIG. 3.

In the present arrangement, the shutter blades 28, 30 are drawn from their scene light unblocking open arrangement as shown in FIG. 3 to their scene light blocking closed arrangement as shown in FIG. 1 when the solenoid 54 is energized. Consequently, energization of solenoid 54 prevents the shutter blades 28, 30 from moving towards their maximum effective primary aperture defining arrangement under the urging of the spring 58. However, the exposure control system 10 is equally applicable for use in photographic systems wherein the shutter blades 28, 30 are spring biased to a closed position. In this embodiment, it would otherwise be necessary to maintain the solenoid in a state of continued energization for holding the shutter blade elements 28, 30 in their scene light blocking arrangement. However, for avoiding battery power drain by continued solenoid energization, a latch mechanism (not shown) is provided operable for latching the shutter blade mechanism in its scene light blocking arrangement and then automatically unlatching the shutter blade mechanism to permit its movement to the scene light unblocking arrangement in order to commence a photographic exposure cycle. Further, this latch mechanism automatically responds at the termination of an exposure cycle to relatch the shutter blade elements 28, 30 in their scene light blocking arrangement. More details of the structure and the manner in which the aforementioned latch operates is more fully described in U.S. Pat. No. 4,040,072, which is assigned in common herewith.

Reference is now made to the flash strobe unit 60 of the present embodiment. In essence, the electronic flash strobe unit 60 is cooperatively associated with the photographic camera apparatus to contribute a predetermined proportion, i.e., fill flash of the scene light admitted by the shutter blade mechanism to expose the film in a manner to be subsequently described. Since this type of fill flash does not per se form an aspect of the present invention, only those details necessary for an understanding of the present invention will be described. However, a more detailed description of the electronic flash apparatus is given in copending U.S. Patent application Ser. No. 74,993, filed on Sept. 13, 1979 now U.S. Pat. No. 4,255,030, issued Mar. 10, 1981, and assigned in common herewith. This electronic flash strobe unit 60 can be affixed to an upper surface of the camera housing 12. Included in the flash unit 60 is a flash discharge tube 62 located in a suitable reflector 64 behind a lens 66. A quench tube (not shown) is provided for interrupting the flash discharge of the flash discharge tube 62 in a manner to be more fully described. Electronic power for the electronic flash strobe unit 60 is provided by a battery (not shown) carried in the film pack 20.

Referring back to the scene light sensing and summing station 40, it, in part, includes a pair of spaced apart photoresponsive devices or photocell detectors 68, 68' aligned with a photocell light entry window (not shown) in the housing 12. The photocell detectors 68, 68' are, preferably, of the silicon photodiode type and serve as a pair of scene light detectors, each providing a separate photoresponsive region. Also included in the light sensing and summing station 40 is an exposure control circuit 70 (FIG. 6), which, as will be explained, alternatively cooperates with the photocell detectors 68, 68' and is capable of terminating the exposure interval as a function of time integration of the intensity of scene light incident upon either. As noted, the scene light is controlled by the overlapping pairs of photocell sweep apertures 36, 38 (FIG. 4). Included in the light sensing and summing station 40 is a photocell lens 72, preferably, constructed as an integral unit, wherein top and bottom lens half portions 74, 76 direct the scene light to corresponding ones of photocell detectors 68, 68'. The light sensing and summing station 40 provides means for sensing and summing scene radiation during an exposure interval.

In the illustrated embodiment, a different photometric response for each of the photocell detectors 68, 68' is achieved by virtue of the upper lens portion 74 having a spectral filter 78 preferably an IR absorption filter, connected to a rear lens surface thereof, while the lens portion 76 will admit IR frequencies as well as visible light frequencies. It is preferred that the spectral filter 78 be a blocking infrared radiation filter of the type attenuating electromagnetic frequencies in the near IR region (e.g., 700–1200 nm). Thus, the upper lens portion 74 including the blocking IR filter 78 will transmit visible spectral energy to the exclusion of infrared spectral energy whereas the lower lens portion 76 will transmit both. Alternatively, this invention contemplates that the lower lens portion 76 could be made with a spectral filter associated therewith having photoresponsive characteristics which, in addition to passing IR, are different than that of the blocking IR filter 78.

As noted, the pairs of secondary sweep apertures 36, 38, respectively, control passage of scene light from the different lens portions 74, 76 to the corresponding photocell detectors 68, 68'. Towards this end, the shutter blades 28, 30 are appropriately positioned relative to the photocell lens 72 to ensure that the pairs of secondary sweep apertures 36, 38 define effective aperture values which direct scene light in the manner mentioned above.

Figure 6:
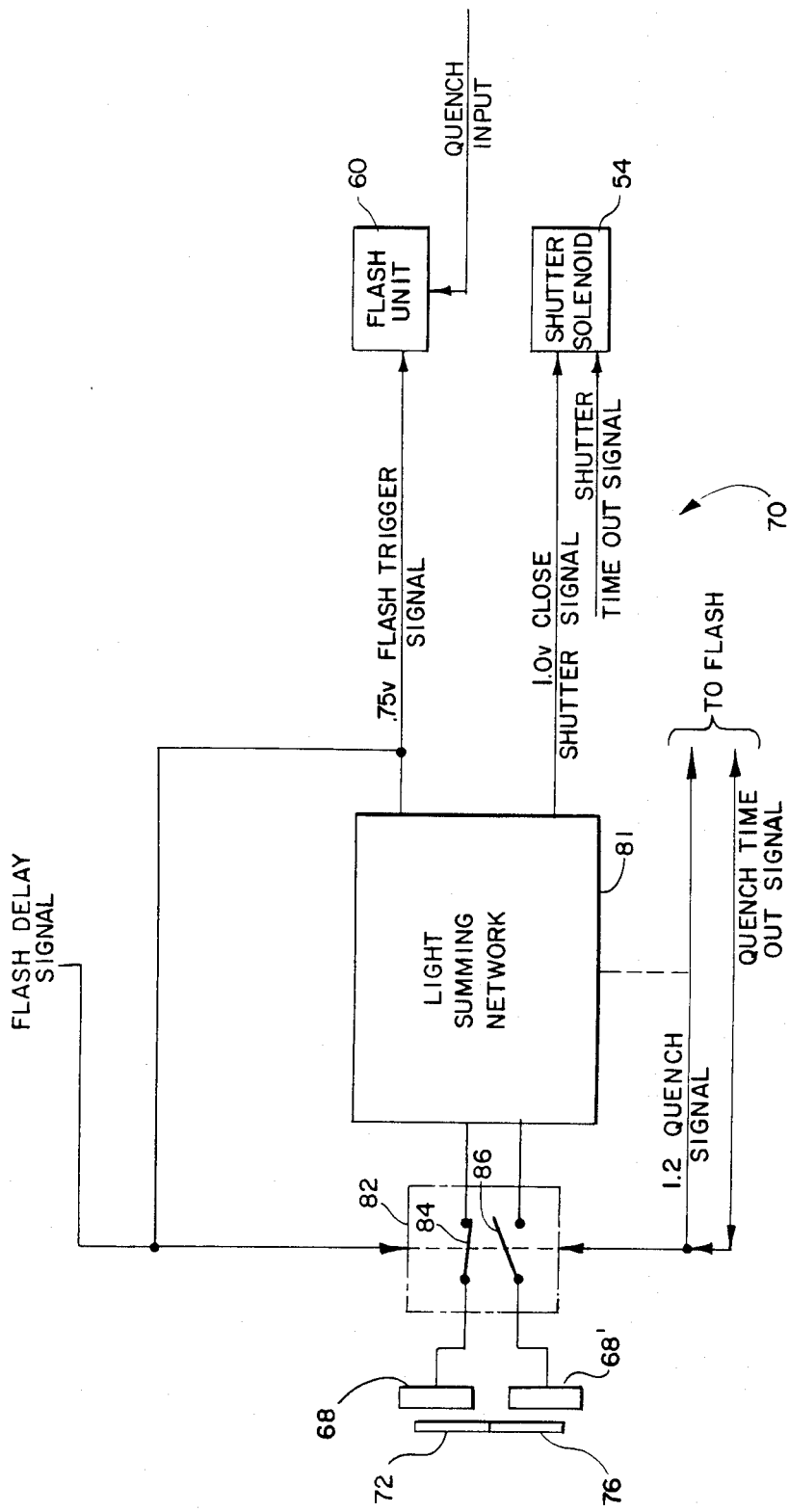
FIG. 6 is a diagrammatic view showing the improved circuitry for effecting controlled exposure in accordance with this invention.

Referring now to FIG. 6, there is shown in block diagram form the exposure control circuit 70 included in the light sensing and summing station 40 which is associated with the exposure control system 10 and the electronic flash unit 60, so as to contribute a predetermined proportion (e.g., fill flash) to the scene light admitted by the shutter blade mechanism to expose the film in a manner to be described. With the exception of the two sensing arrangements and their selective utilization, this exposure control circuit 70 is quite similar to that described in the noted copending application U.S. Ser. No. 74,993 now U.S. Pat. No. 4,225,030, issued Mar. 10, 1981 and is herein incorporated by reference and includes a scene light integrating or summing circuit 81. Only those aspects of the foregoing circuit necessary for an understanding of the present invention will be set forth. In this regard, the output signal from a light integrating capacitor (not shown) of the scene light summing network 81 is directed to three level detector circuits (not shown) of the control circuit 70, all of which may be of a well-known design, such as a Schmitt trigger. The output from one of these level detectors controls a flash fire trigger circuit (not shown) which operates the flash tube 62. The output signal from a second level detector is effective to control the energization of the solenoid 54. The output signal from a third level detector is effective for controlling a quench fire trigger circuit (not shown) which operates the flash tube (not shown) for interrupting the flash discharge of the flash tube 62.

For purposes of illustrating operation of the flash unit 60, the level detector which controls energization of the solenoid 54 is configured to trigger a 1.0 volts, which is a normalized value representative of a select or optimum film exposure value for a predetermined film speed; the level detector for controlling the quench trigger circuit is set to trigger at 1.2 volts; and the level detector for controlling the flash fire trigger circuit is set to trigger at 0.75 volts. Reasons for these values are more adequately described in the last noted copending application. These values are used herein, however, for better describing the present invention. Also provided is a flash time delay circuit (not shown) for receiving an input signal upon the deenergization of the solenoid 54 to provide a time delayed output signal for firing the flash. The time delay provided by the flash delay circuit may be in the order of 65±4 msec. A shutter time out circuit (not shown) is provided, as described in the noted copending application, for reenergizing the solenoid 54 if the total scene light integrated fails to reach the threshold value necessary for operating the solenoid 54. For example, the solenoid time out circuit could actuate the solenoid 54 at about 100 msec. after exposure commencement.

The control circuit 70 differs from that described in the last noted copending application by the addition of a flash time out signal (not shown). This flash time out circuit is similar to the flash fire circuit and the shutter time out circuit and is enabled at the beginning of flash fire for effecting a signal after a preselected time interval (e.g., 2 msec.) to the switch circuit 82. This latter time out signal is effective should the 1.2 volt threshold value necessary for actuating the quench tube not be obtained. In this case the flash is not quenched but permitted to dissipate by itself. This latter situation could arise under conditions wherein the subject is beyond the effective range of the flash and there is relatively low intensity scene light. For example, an exposure of the Grand Canyon in the early morning or evening would create conditions such as those described wherein the threshold value for the quench tube actuation might not be reached. Thus, the flash time out circuit will ultimately be effective to terminate the use of the flash photocell detector 68'. Other devices besides a time out circuit could also be used for effecting the noted operation.

Importantly, it should be noted that operation of the control circuit 70 results in the flash being fired for a short portion of each exposure cycle, but at different time intervals thereof. The flash firing as indicated is a function of scene light integration performed by the summing capacitor of the light summing network 81.

Continued reference is now made to the circuit diagram of FIG. 6 to show the switching circuit 82 of the present invention. Essentially, the switching circuit 82 provides means which when suitably actuated automatically makes the summing capacitor of the summing network 81 sequentially responsive to alternate ones of the photocell detectors 68, 68' as a function of the beginning and ending of the flash firing interval. Towards this end, each of the photocell detectors 68, 68' is connected in parallel through suitable switches 84 and 86 (e.g., electronic switches) to the noted integrating network 81. For purposes of illustration, these switches 84, 86 are shown schematically as simple mechanical switches being interconnected in a fashion so that they are always in opposite states or, that is, when one is opened the other is closed and vice versa. More specifically, at the start of exposure, the switching circuit 82 is programmed so that switch 84 will be closed (in its conducting state or condition) when switch 86 is open (in its non-conducting condition). Then, upon subsequent actuation of the circuit 82, the switch 84 is opened while the switch 86 is automatically closed. Further actuation will cause the switches 84, 86 to reset to the earlier noted condition.

Actuation of the switching circuit 82 to effect operation of the switches 84 and 86, as noted, is accomplished by means of the control circuit 70. In this regard, light summing is through detector 68 and IR filter 78 by way of closed switch 84 during an initial portion of the exposure interval which only receives ambient light. Upon firing of the flash, the switching circuit 82 is actuated to open switch 84 and close switch 86 such that the continued summing during the flash portion of the interval is now from detector 68' which receives infrared radiation. In this connection, the level detector, which actuates the flash fire circuit, can also be used to simultaneously actuate the switching circuit 82 so that the switch 84 opens and the switch 86 simultaneously closes. Hence, during the flash, the light summing network 81 becomes electrically responsive to the photocell detector 68' which is, in turn, responsive to both IR and visible spectral energy.

Under conditions where flash firing is effective to produce a summing value of 1.2 volts, the quench signal may be employed to reset the switching circuit for the next exposure. In those situations wherein the flash is ineffective (since the subject being photographed is beyond the effective range of the flash) and the scene light intensity is relatively low, it is desirable that summing be returned to the filtered detector 68 for the portion of the exposure following the flash. Now in such situations, the termination of the flash is accomplished by the flash time out circuit as described earlier.

Hence, the switching circuit is also actuated by the flash time out signal to accommodate the latter circumstances. It should be appreciated, however, that other suitable circuitry can be employed for purposes effecting the desired switching of the switch circuit 82 as a function of the flash.

The overall operation of the camera will now be explained. Operation of the camera actuator button (not shown) powers up the camera 12, enables the flash strobe unit 60 for subsequent firing and releases the shutter latch mechanism to allow the shutter blades 28, 30 to commence an exposure cycle. More specifically, the blades 28, 30 move in opposite directions from the scene light blocking condition of FIG. 1 toward the maximum scene light admitting condition shown in FIG. 3. Thus, the primary aperture area overlapping the light entering exposure opening 16 is enlarged progressively.

Simultaneously with the enlarging primary aperture values, the pairs of secondary photocell sweep apertures 36, 38 define corresponding progressively changing secondary effective aperture values relative to corresponding ones of the photocell detectors 68, 68'. This is best viewed in FIG. 4. Thus, each of the pair of secondary photocell sweep apertures 36 is brought in scene light transmitting relation to both lens portion 74 (which cooperates with the IR blocking filter 78) and to the lens portion 74. At this time, only switch 84 is closed and hence summing is from only the photocell detector 68. It is also to be understood that the effective photocell sweep secondary aperture values defined by the overlapping pair of effective scene light admitting primary aperture values defined by the overlapping primary apertures 32 and 34 to anticipate in a well-known manner for the additional scene light admitted to the film plane during the finite time required to drive the shutter blades 28, 30 from the scene light unblocking arrangement of FIG. 3 back to the scene light blocking arrangement of FIG. 1, as is more fully described in U.S. Pat. No. 3,896,458, entitled "Automatic Exposure Control System", issued July 22, 1975, in common assignment herewith and now incorporated by reference herein.

It will be appreciated that as the exposure interval progresses, the flash tube 60 will be fired in response to the preselected thereshold value for such firing (e.g., 0.75 volts) being reached. Responsive to this firing an appropriated signal will be forwarded to the switching circuit 82 for effectuating the switching action, whereby the switch 84 opens and the switch 86 closes. As a result, the light summing network 81, which was exclusively responsive to the blocking IR filtered photocell detector 68, is now exclusively responsive to the non IR-filtered photocell detector 68' during the strobe flash.

Thus, the light summing network 81 is no longer blocked from receiving IR radiation. As a result, the network 81 will be responsive to visible frequencies and IR frequencies. In this manner, the earlier mentioned difficulties associated with disparate reflectivity values encountered during the flash mode will be substantially overcome. In this regard, it should be noted that objects measured in the visible spectral region exhibit different light reflectivities depending on their light absorption while the near infrared region (e.g., 750–1200 nm) is characterized by more uniform reflectivity for most common materials. Therefore, the IR reflectivity is much less dependent on the visible color (specific visible light absorption), and objects viewed by infrared radiation are relatively independent of the reflectivity disparities earlier described. Consequently, in scenes where disparate visible reflectivities are present (or which can be exaggerated by directed light sources such as flash bulbs or strobe lights), the IR radiation is preferably left undisturbed.

Finally, at the termination of flash firing, the quench signal derived from the integrator or the flash time out circuit is effective to cause the switch 84 to again close and the switch 86 to open. As a result of the summing circuit or shutter time out signal, the control circuit 70 will reenergize the solenoid 54 to cause the shutter blades 28, 30 to move from a scene light admitting condition to the scene light blocking condition of FIG. 1 for terminating the exposure interval. Thus, at the end of each exposure interval and at the commencement of the next exposure interval, the network 81 will be responsive to the blocking IR filtered photocell detector 68 until, of course, the flash unit 60 is actuated for firing.

The light integrating unit provides an evaluation of scene radiation during an evaluation period which, in the illustrated embodiment, occurs essentially simultaneous with at least the initial stages of the exposure interval. Further, since the light integration only continues until a 1.2 volt level is reached, the actual length of the evaluation period is determined by the scene radiation; however, it should be understood that novel arrangements described herein are also applicable to pre-evaluation of the scene lighting and to fixed periods of evaluation.

Since certain changes may be made in the above-described system and apparatus without departing from the scope of the invention herein involved, it is intended that all matter contained in the description thereof or shown in the accompanying drawings shall be interpreted as illustrative and not in a limiting sense.

What is claimed is:

1. A photographic apparatus having means for directing image forming light rays from a scene to image recordable material mounted at a given focal plane, means for evaluating radiation from said scene during an evaluation period, means for unblocking and blocking a given path to provide an exposure interval during each part of which essentially the same given range of spectral frequencies are continuously transmitted from the scene to the focal plane, and means responsive to said evaluation means for controlling said photographic apparatus to define a suitable exposure, the improvement wherein said evaluating means includes:

at least a pair of fixed photoresponsive regions, each having photoresponsive characteristics differnt from the other for sensing different relative proportionalities of spectral frequencies of scene radiation; and means for automatically electrically switching between outputs of each of said photoresponsive regions in general operative relationship with the commencement of a pulse of illumination so that scene radiation is evaluated from one region substantially during one portion of said evaluation period and from another region during another portion of said evaluation period.

2. The camera of claim 1 including means for producing a flash of illumination during said other portion of said period.

3. In an exposure control system for use in a photographic camera having means for directing image forming rays from a scene along a given path to photographic film material mounted in the camera focal plane, said system including means for unblocking and blocking passage of scene light along said path, to provide an exposure interval during each part of which essentially the same given range of spectral frequencies are continuously transmitted from the scene to the focal plane, means for sensing and summing scene radiation from said scene during an exposure interval, means responsive to said sensing means for controlling said unblocking and blocking means to define an exposure interval selected in accordance with an accumulated total of scene radiation sensed by said sensing means, the improvement wherein:

said sensing means includes at least a pair of fixed photocell detectors, each having photoresponsive characteristics different from the other; and means for automatically switching between each of said detectors in general operative relationship with the commencement of a pulse of illumination so that scene radiation is summed from one photocell detector substantially during one portion of said exposure interval and from another photocell detector during another portion of said exposure interval.

4. In an exposure control system for use in a photographic camera having means for directing image forming rays from a scene along a given path to photographic film material mounted in the camera focal plane, said system including means for unblocking and blocking passage of scene light along said path, means for sensing and summing scene radiation from said scene during an exposure interval, means responsive to said sensing means for controlling said unblocking and blocking means to define the exposure interval selected in accordance with an accumulated total of scene radiation sensed by said sensing means, flash means for producing a pulse of illumination directed at the scene during a portion of the exposure interval, the improvement wherein:

said sensing means includes at least a pair of fixed photoresponsive regions, each having photoresponsive characteristics different from the other with one of said regions tailored for sensing ambient scene illumination and the other tailored for sensing flash scene illumination; and means for automatically switching from said one photoresponsive region to said other in general operative relationship with the commencement of the pulse of illumination so that scene radiation is summed from said other region substantially during a flash portion of said exposure interval and from said one region during another portion of said exposure interval.

5. The system of claim 4 wherein the spectral response of said one of said photoresponsive regions is different from said other.

6. The system of claim 4 wherein the spectral response of both photoresponsive regions are at least generally mutually exclusive.

7. The system of claim 4 wherein the spectral response of said other region substantially includes infrared radiation.

8. The system of claim 4 wherein said switching means is defined by switching circuitry operative generally upon commencement of the pulse of illumination defining the flash portion of the exposure interval to have said other photoresponsive region summed by said sensing and summing means; and operative generally upon termination of said flash portion to have said summing means responsive to said one photoresponsive region.

9. The system of claim 8 wherein said switching circuitry includes first and second switches interconnecting respective ones of said photoresponsive regions, respectively, to said switching circuitry whereby generally upon commencement of the flash portion the first switch electrically interconnects said other photoresponsive region to said sensing and summing means, and generally upon termination of the flash portion the second switch electrically interconnects said one photoresponsive region to said sensing and summing means, and the first switch electrically disconnects said one photoresponsive region from said sensing and summing means.

10. The system of claim 9 wherein said sensing and summing means includes summing circuitry responsive to each of said photoresponsive regions for providing a time varying response representative of the time summing of the scene light incident upon said photoresponsive regions.

11. The system of claim 4 wherein each one of said one and said other photoresponsive regions of said sensing and summing means includes first and second photocell detectors, respectively, which senses the scene light radiation incident thereon; and means for directing scene radiation to each of said photocell detectors, said scene light directing means including a pair of lens portions wherein each of said portions directs scene light to corresponding ones of said first and second photocell detectors.

12. The system of claim 11 wherein said lens portion associated with said first photocell detector has operatively associated therewith a blocking infrared filter so as to preclude transmission of infrared frequencies to said first photocell detector.

13. In a photographic apparatus having means for directing image forming rays from a scene along a given path to photograhic film material mounted in the camera focal plane, means for unblocking and blocking passage of scene light radiation along said path to provide an exposure interval during each part of which essentially the same given range of spectral frequencies are continuously transmitted from the scene to the focal plane, means for sensing and summing radiation from said scene during an exposure interval; means responsive to said sensing means for controlling said unblocking and blocking means to define the exposure interval selected in accordance with an accumulated total of scene radiation sensed by said sensing means, flash means for producing a pulse of illumination directed at the scene during a portion of the exposure interval, the improvement wherein:

said sensing means includes at least a pair of fixed photoresponsive regions, each having photoresponsive characteristics different from the other with one of said regions tailored for sensing ambient scene illumination and the other tailored for sensing flash scene illumination; and means for electrically switching between outputs of said one photoresponsive region to said other region in response to operation of said flash means so that scene radiation is summed from said other region substantially during a flash portion of said exposure interval.

14. The apparatus of claim 13 wherein the spectral response of said one of said photoresponsive regions is different from said other.

15. The apparatus of claim 13 wherein the spectral response of both photoresponsive regions are at least generally mutually exclusive.

16. The apparatus of claim 13 wherein the spectral response of said other region substantially includes infrared radiation.

17. The apparatus of claim 13 wherein said switching means for automatically switching between said photoresponsive regions is defined by switching circuitry operative generally upon commencement of the pulse of illumination defining the flash portion of the exposure interval to have said other photoresponsive region summed by said sensing and summing means; and operative generally upon termination of said flash portion to have said summing means responsive to said one photoresponsive region.

18. The apparatus of claim 17 wherein said switching circuitry includes first and second switches interconnecting respective ones of said photoresponsive regions, respectively, to said sensing and summing means whereby generally upon commencement of the exposure interval the first switch electrically interconnects said one photoresponsive region to said sensing and summing means, and generally upon commencement of the flash portion the second switch electrically interconnects said other photoresponsive region to said sensing and summing means, and the first switch electrically disconnects said one photoresponsive region from said sensing and summing means.

19. The apparatus of claim 18 wherein said sensing and summing means includes summing circuitry responsive to each of said photoresponsive regions for providing a time varying response representative of the time summing of the scene light incident upon said photoresponsive regions.

20. The apparatus of claim 13 wherein said photoresponsive regions of said sensing and summing means includes first and second photocell detectors, respectively, which senses the scene light radiation incident thereon; and means for directing scene radiation to each of said photocell detectors, said scene light directing means including a pair of lens portions wherein each of said portions directs scene light to corresponding ones of said first and second photocell detectors.

21. The apparatus of claim 20 wherein said lens portion associated with said first photocell detector has operatively associated therewith a blocking infrared filter so as to preclude transmission of infrared frequencies to said first photocell detector.

22. In a photographic apparatus having means for directing image forming light rays from a scene to a photographic film material mounted at a given focal plane, means for evaluating radiation from said scene during an evaluation period, means for unblocking and blocking a path, and means responsive to said evaluation means for controlling said unblocking and blocking means to define an exposure interval, the improvement wherein said evaluating means includes:

means for selectively substantially precluding evaluation of selected spectral frequencies along a first path and substantially permitting evaluation of the selected spectral frequencies along a second path including at least a pair of fixed photoresponsive regions, each having photoresponsive characteristics different from the other and wherein one of said regions is responsive to spectral frequencies other than the precluded spectral frequencies along the first path, and the other of said regions is responsive to the preselected spectral frequencies along the second path; and means for automatically electrically switching between outputs of said photoresponsive regions in general operative relationship with the commencement of a pulse illumination so that scene radiation is summed by the one region substantially during one portion of said exposure period and from the other region during another portion of 23. A method of exposing photographic film comprising the steps of:

initiating a scene light evaluation period by directing image forming scene light rays from a scene to be photographed to photographic film material located at a given focal plane;

evaluating a first range of selected spectral frequencies of the scene illumination along a first path by a first fixed photoresponsive region during at least a portion of the evaluating period;

automatically evaluating a second range of selected spectral frequencies of the scene illumination along a second path by a second fixed photoresponsive region which is spaced from said first region during at least another portion of the evaluation period wherein the first and second ranges evaluated are at least partially different and wherein said step of automatically evaluating the second range is accomplished by electrically switching between the outputs of said first and second regions in general operative relationship with the commencement of a pulse illumination; and blocking the passage of image forming light rays from the scene to the film in response to predetermined values of evaluated scene radiation to thereby terminate the evaluation period.

24. In an exposure control system for use in a photographic camera having means for directing image forming rays from a scene along a given path to photographic film material mounted in the camera focal plane, said system including means for unblocking and blocking passage of scene light along said path, means for sensing and summing scene radiation from said scene during an exposure interval, means responsive to said sensing means for controlling said unblocking and blocking means to define the exposure interval selected in accordance with an accumulated total of scene radiation sensed by said sensing means, flash means for producing a pulse of illumination directed at the scene during a portion of the exposure interval, the improvement wherein:

said sensing means includes at least a pair of photoresponsive regions, each having photoresponsive characteristics different from the other with one of said regions tailored for sensing ambient scene illumination and the other tailored for sensing flash scene illumination; and means for automatically employing each of said photoresponsive regions so that scene radiation is summed from said other region substantially during a flash portion of said exposure interval and from said one region during another portion of said exposure interval, said means for automatically employing each of said photoresponsive regions is defined by switching circuitry operative generally upon commencement of the pulse of illumination defining the flash portion of the exposure interval to have said other photoresponsive region summed by said sensing and summing means; and operative generally upon termination of said flash portion to have said summing means responsive to said one of said photoresponsive regions.

25. In a photographic apparatus having means for directing image forming rays from a scene along a given path to photographic film material mounted in the camera focal plane, means for unblocking and blocking passage of scene light radiation along said path, means for sensing and summing radiation from said scene during an exposure interval; means responsive to said sensing means for controlling said unblocking and blocking means to define the exposure interval selected in accordance with an accumulated total of scene radiation sensed by said sensing means, flash means for producing a pulse of illumination directed at the scene during a portion of the exposure interval, the improvement wherein:

said sensing means includes at least a pair of photoresponsive regions, each having photoresponsive characteristics different from the other with one of said regions tailored for sensing ambient scene illumination and the other tailored for sensing flash scene illumination; and means for automatically employing each of said photoresponsive regions so that scene radiation is summed from said other region substantially during a flash portion of said exposure interval and from said one region during another portion of said exposure interval, said means for automatically employing each of said photoresponsive regions is defined by switching circuitry operative generally upon commencement of the pulse of illumination defining the flash portion of the exposure interval to have said other photoresponsive region summed by said sensing and summing means; and operative generally upon termination of said flash portion to have said summing means responsive to said one of said photoresponsive regions.

26. In a photographic apparatus having means for directing image forming light rays from a scene along a given path to a photographic film material mounted at a given focal plane, means for evaluating radiation from said scene during an evaluation period, means for unblocking and blocking said path, and means responsive to said evaluation means for controlling said unblocking means to define an exposure interval, the improvement wherein said evaluating means includes:

means for selectively substantially precluding evaluation of selected spectral frequencies including at least a pair of fixed photoresponsive regions, each having photoresponsive characteristics different from the other, wherein one of said regions is essentially responsive to frequencies other than infrared frequencies while the other of said regions is responsive to a plurality of frequencies including infrared frequencies; and means for automatically electrically switching between outputs of said photoresponsive regions in general operative relationship with the commencement of a pulse of illumination so that scene radiation is summed from one region substantially during one portion of said evaluation period and from another region during another protion of said evaluation period.

27. In a photographic apparatus having means for directing image forming light rays from a scene along a given path to a photographic film material mounted at a given focal plane, means for evaluating radiation from said scene during an evaluation period, means for unblocking and blocking said path, and means responsive to said evaluation means for controlling said unblocking means to define an exposure interval the improvement wherein said evaluating means includes:

means for selectively substantially precluding evaluation of selected spectral frequencies including at least a pair of fixed photoresponsive regions, each having photoresponsive characteristics different from the other;

means for automatically electrically switching between outputs of said photoresponsive regions in general operative relationship with the commencement of a pulse of illumination so that scene radiation is summed from one region substantially during one portion of said evaluation period and from another region during another portion of said evaluation period; and means for producing a flash of illumination during said other portion of said period.

28. In a photographic apparatus having means for directing image forming light rays from a scene along a given path to a photographic film material mounted at a given focal plane, means for evaluating radiation from said scene during an evaluation period, means for unblocking and blocking said path to provide an exposure interval during each part of which essentially the same given range of spectral frequencies are continuously transmitted from the scene to the focal plane, and means responsive to said evaluation means for controlling said unblocking means to define an exposure interval, the improvement wherein said evaluating means includes:

means for selectively substantially precluding evaluation of selected spectral frequencies including at least a pair of photoresponsive detectors, each having photoresponsive characteristics different from the other; and means including switching circuitry for automatically electrically switching between outputs of said photoresponsive regions in general operative relationship with the commencement of a pulse of illumination so that scene radiation is summed from one detector substantially during one portion of said evaluation period and from another detector during another portion of said evaluation period.

29. Camera apparatus for exposing image recordable material, said apparatus comprising:
first evaluating means having one photoresponsive characteristic for sensing a relative proportionality of spectral frequencies of scene radiation;
second evaluating means having another photoresponsive characteristic for sensing a different relative proportionality of spectral frequencies of scene radiation;
means operable for producing a pulse of illumination;
evaluation control means for automatically independently switching between said first and second evaluating means with the commencement of the pulse of illumination during an exposure cycle of the apparatus; and
exposure control means responsive to said first and second evaluating means for providing a suitable exposure in accordance with each of the different evaluations of said scene, said exposure control means including means for providing an exposure interval during each part of which essentially the same given range of spectral frequencies are transmitted to a focal plane of the apparatus.

30. The apparatus of claim 29 wherein said first evaluating means evaluates scene radiation essentially exclusive of a spectral frequency evaluated by said second evaluating means.

31. The apparatus of claim 29 wherein said different photoresponsive characteristics of said first and second evaluating means provide evaluation of different proportionalities of infrared scene radiation.

32. The apparatus of claim 31 wherein said first evaluating means is responsive to a given proportionality of visible and infrared frequencies and said second sensing means is responsive to a different relative proportionality of said visible and infrared frequencies.

33. The apparatus of claim 31 wherein said evaluation control means includes means for rendering said first and second evaluating means operative in at least non-coextensive intervals.

34. The apparatus of claim 31 wherein said evaluation control means includes means for rendering said first and second evaluating means alternately operative.

35. The apparatus of claim 32 wherein said evaluation control means includes means for rendering said first evaluating means operative during at least transient illumination of said scene and said second evaluating means operative during at least other times.

36. The apparatus of claim 35 wherein said first evaluating means senses at least infrared scene radiation and said second evaluation means senses scene radiation having a reduced infrared contribution.

37. The apparatus of claim 36 wherein said evaluation control means renders at least said first evaluating means operative during film exposure.

38. A method of exposing photographic material by an exposure control system for use in a photographic camera comprising the steps of:
directing image forming rays from a scene along a given path to the photographic film material mounted in the focal plane of the camera;
evaluating light radiation from said scene during an evaluation period wherein the evaluating step uses two fixed photoresponsive regions each having photoresponsive characteristics different from the other;
controlling unblocking and blocking of scene light along said path to define an exposure interval during each part of which essentially the same given range of spectral frequencies are continuously transmitted from the scene to the focal plane and which interval is selected in accordance with the evaluated scene radiation;
providing a pulse of illumination during said period; and
automatically switching from one of the photoresponsive regions to the other in operative relationship to the general commencement of the pulse of illumination.

39. The method of claim 38 further comprising the step of again exclusively employing said one of the two photoresponsive regions generally upon termination of the flash portion of the exposure interval.

40. The method of claim 38 comprising the step of having the spectral response of the one photoresponsive region different than the other of the two photoresponsive regions.

41. The method of claim 38 comprising the step of having the spectral response of both photoresponsive regions being at least generally mutually exclusive.

42. The method of claim 38 comprising the step of having the spectral response of the other of the two photoresponsive regions substantially include infrared radiation.

* * * * *